G. W. KING.
Horse Rake.
2 Sheets—Sheet 1.
No. 70,004.
Patented Oct. 22, 1867.
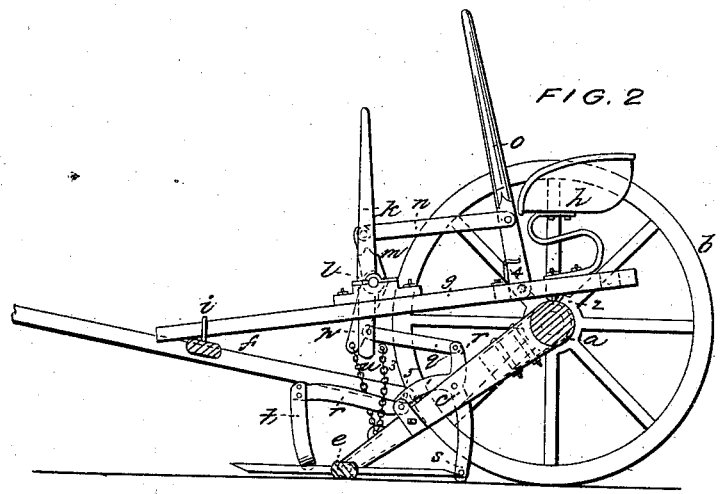
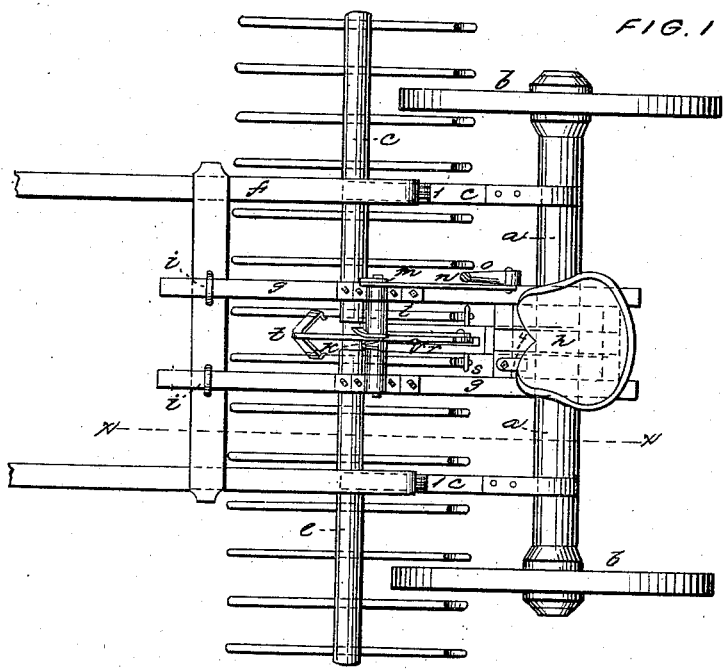
WITNESSES:
INVENTOR:

G. W. KING.
Horse Rake.
No. 70,004.
2 Sheets—Sheet 2.
Patented Oct. 22, 1867.
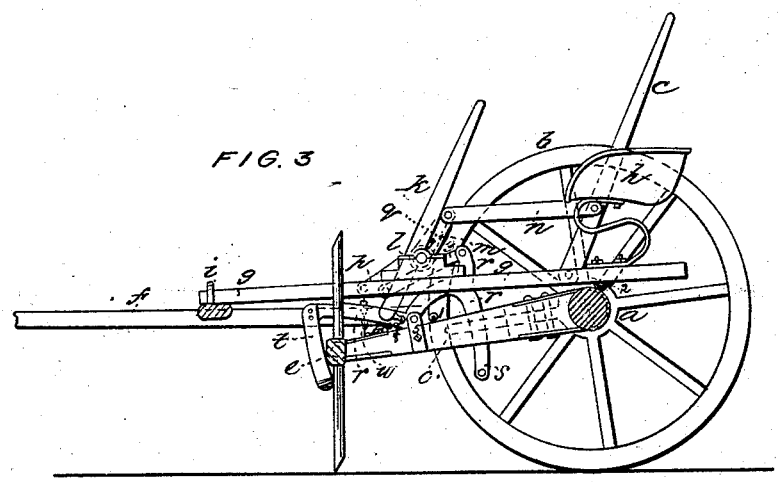
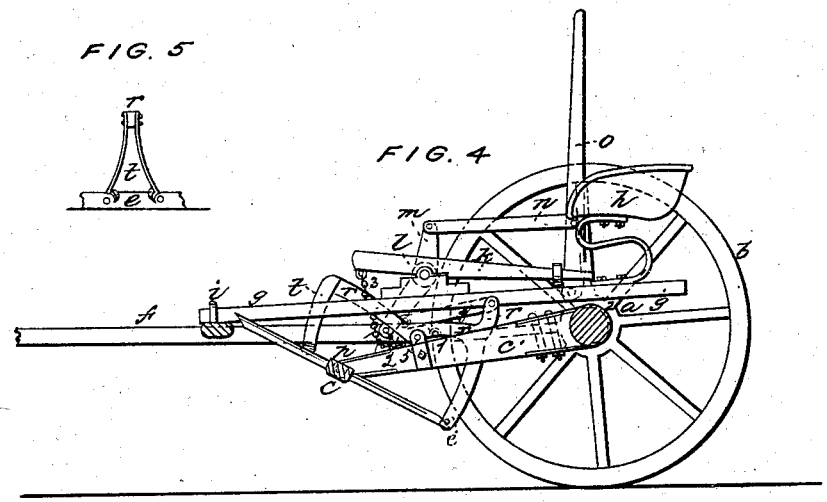
WITNESSES:
INVENTOR:
George W. King

United States Patent Office.

GEORGE W. KING, OF SCHOHARIE, NEW YORK.

Letters Patent No. 70,004, dated October 22, 1867.

IMPROVEMENT IN HORSE-RAKES.

*The Schedule referred to in these Letters Patent and making part of the same.*

TO ALL WHOM IT MAY CONCERN:

Be it known that I, GEORGE W. KING, of Schoharie, in the county of Schoharie, and State of New York, have invented, made, and applied to use, a certain new and useful Improvement in Horse-Rakes; and I do hereby declare the following to be a full, clear, and exact description of the said invention, reference being had to the annexed drawing, making part of this specification, wherein—

Figure 1 is a plan of the said machine.

Figure 2 is a side view, sectionally at $x\ x$, of the same, in the position for use in raking.

Figure 3 is a similar view in position for dumping the hay by revolving over the same, and Figure 4 is a side view, with the rake elevated for going to the field.

Similar marks of reference denote the same parts.

I employ links between the revolving rake and the axle, and connect the shafts to such links, and I combine therewith a seat-rider, hinged to the axle, and sliding at the front end in loops on the shafts, so as to allow for the increased distance between the shafts and axle, when the links are raised for revolving the rake; and I make use of an elevating-lever, and a dumping-spring that presses down the teeth as the rake is raised, and which spring yields as the rake-teeth pass, and catches over them again.

In the drawing, $a$ is the axle, $b$ the wheels, one of which is represented as removed in figs. 2, 3, and 4. $c$, $c$, and $c'$ are links, connected at their upper and back ends to the axle $a$ by straps surrounding the same, and forming a hinge that allows the links to turn on the axle. At their lower and forward ends these links $c$, $c$, and $c'$ receive the head $e$ of the revolving rake. $f$ are the shafts, hinged at 1 to the links $c$, so that the pull of the horse tends slightly to lift said rake. $g$ is the seat-rider, formed of two bars, hinged at 2 to the axle $a$, and carrying the seat $h$, and at their front said seat-rider bars slide through loops $i$ on the cross-piece of the shafts $f$. $k$ is a lever on a shaft, $l$, with a chain, 3, to the link $c'$, by means of which the rake can be elevated, as seen in fig. 4, for going to the field, and the turn-button or catch 4 holds the lever down. The shaft $l$ is the fulcrum of a lever, $m$, connected by a link, $n$, to the handle $o$, and $p$ is an arm from the shaft $l$ to a link, $q$, that connects with the dumping-lever $r$ on a fulcrum, 5, on the link $c'$. This lever $r$ extends back as a treadle, $s$, and forward is formed with the dumping-spring or springs $t$ that are adapted to take over the teeth of the rake. $u$ is a chain, from the end of the arm $p$ to the link $c'$.

It will now be seen that when the driver pulls the handle $o$ towards him the chain $u$ raises the rake, and that the dumping-spring $t$ presses down the forward ends of the rake-teeth simultaneously, causing said rake to revolve over and leave its load, and in the rake-teeth passing down the side of the dumping-springs $t$, they yield, and afterwards pass again over the teeth, so that their lower ends are in a position to again act on the teeth, as seen in the detached Figure 5.

What I claim, and desire to secure by Letters Patent, is—

1. The links $c\ c'$, hinged to the axle $a$, and receiving the rake-head $e$, in combination with the shafts $f$ and sliding seat-rider $g$, substantially as set forth.

2. The arrangement of the lever $r$, dumping-spring $t$, treadle $s$, levers $m$, $p$, and $o$, and chain $u$, substantially as and for the purposes set forth.

In witness whereof I have hereunto set my signature this first day of June, A. D. 1867.

GEO. W. KING.

Witnesses:
CHAS. H. SMITH,
GEO. D. WALKER.